(12) United States Patent
Lorberg et al.

(10) Patent No.: US 11,093,913 B2
(45) Date of Patent: Aug. 17, 2021

(54) SYSTEMS AND METHODS FOR DISTRIBUTING PAYMENT NETWORK SERVICES

(71) Applicant: MASTERCARD INTERNATIONAL INCORPORATED, Purchase, NY (US)

(72) Inventors: Dana J. Lorberg, St. Louis, MO (US); Piruthiviraj Sivaraj, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 87 days.

(21) Appl. No.: 16/707,237

(22) Filed: Dec. 9, 2019

(65) Prior Publication Data

US 2020/0118102 A1 Apr. 16, 2020

Related U.S. Application Data

(63) Continuation of application No. 15/434,287, filed on Feb. 16, 2017, now Pat. No. 10,504,076.

(60) Provisional application No. 62/295,813, filed on Feb. 16, 2016.

(51) Int. Cl.
*G06Q 20/40* (2012.01)
*G06Q 20/10* (2012.01)
*G06Q 20/02* (2012.01)
*G06Q 20/38* (2012.01)

(52) U.S. Cl.
CPC ......... *G06Q 20/108* (2013.01); *G06Q 20/027* (2013.01); *G06Q 20/3821* (2013.01); *G06Q 20/405* (2013.01); *G06Q 20/4016* (2013.01)

(58) Field of Classification Search
USPC ..................................... 705/35, 42
See application file for complete search history.

(56) References Cited

U.S. PATENT DOCUMENTS

| | | |
|---|---|---|
| 10,504,076 B2 | 12/2019 | Lorberg et al. |
| 2003/0014525 A1 | 1/2003 | DeLima et al. |
| 2013/0163737 A1 | 6/2013 | Dement et al. |
| 2013/0238408 A1 | 9/2013 | Cooke et al. |
| 2014/0214996 A1 | 7/2014 | Tamas et al. |
| 2015/0039506 A1 | 2/2015 | Groarke et al. |

(Continued)

OTHER PUBLICATIONS

U.S. Appl. No. 15/434,287, filed Feb. 16, 2017, Lorberg et al.

(Continued)

*Primary Examiner* — William E Rankins
(74) *Attorney, Agent, or Firm* — Harness, Dickey & Pierce, P.L.C.

(57) ABSTRACT

Systems and methods are provided for use in distributing one or more services to edge devices in a payment network. One exemplary method includes receiving, at an edge device, an authorization request related to a payment account from a customer, identifying at least one service associated with the request and/or the payment account, and performing said at least one service, at the edge device. The exemplary method further includes transmitting the authorization request to an issuer associated with the payment account, and transmitting an authorization reply, generated by the issuer, to the customer, whereby the at least one service is distributed to the edge device.

19 Claims, 3 Drawing Sheets

(56) References Cited

U.S. PATENT DOCUMENTS

| | | |
|---|---|---|
| 2015/0288578 A1 | 10/2015 | Schwengler et al. |
| 2017/0004498 A1 | 1/2017 | Stroeh et al. |
| 2017/0236106 A1 | 8/2017 | Lorberg et al. |
| 2017/0288958 A1 | 10/2017 | Liu et al. |
| 2021/0006588 A1* | 1/2021 | Rice .................... H04L 63/0227 |
| 2021/0065190 A1* | 3/2021 | Laserson ............ G06Q 20/4016 |

OTHER PUBLICATIONS

PCT International Search Report and Written Opinion (12 pages) of PCT Patent Application No. PCT/US2017/018067, dated Apr. 24, 2017, which has the same priority as the instant application.
U.S. Appl. No. 15/434,287: (a) Office Action dated Mar. 20, 2019; and (b) Notice of Allowance dated Aug. 16, 2019. The instant application is a continuation of U.S. Appl. No. 15/434,287.

* cited by examiner

SYSTEMS AND METHODS FOR DISTRIBUTING PAYMENT NETWORK SERVICES

CROSS-REFERENCE TO RELATED APPLICATION

This application is a continuation application of U.S. patent application Ser. No. 15/434,287 filed Feb. 16, 2017, which claims the benefit of, and priority to, U.S. Provisional Application No. 62/295,813 filed Feb. 16, 2016. The entire disclosure of each of the above applications is incorporated herein by reference.

FIELD

The present disclosure generally relates to systems and methods for distributing services in payment networks, and in particular, to distributing various services, associated with payment accounts and with processing purchase transactions, to edge devices of the payment networks.

BACKGROUND

This section provides background information related to the present disclosure which is not necessarily prior art.

Payment accounts are used by consumers to perform numerous different transactions including, for example, purchase transactions for products (e.g., goods and/or services) from merchants, etc. To facilitate such transactions, payment account credentials (e.g., primary account numbers, tokens, etc.) are known to be provided to merchants via payment devices, whereby the merchants are able to capture the credentials and submit authorization requests for the transactions to a payment network. In connection with processing authorization requests for transactions, for example, the payment network often applies different services in association with the authorization requests for the transactions. In particular, requests associated with transactions from various different regions may be routed from edge devices, at which the transactions are received (and the payment credentials are captured), to a centralized internal payment network device, which processes the requests (e.g., for approval, etc.) and also provides additional dedicated services, such as, for example, fraud services, loyalty account services, authentication services, etc. Often, the additional dedicated services are provided by the centralized internal payment network device in line, or in parallel, with the underlying transaction processing operations.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment networks typically provide added services in conjunction with processing purchase transactions made by consumers, businesses, governments, etc. (all broadly consumers). The added services may seek to, for example, inhibit fraudulent transactions, e.g., the services may include fraud services and/or authentication services, etc., or the services may seek to reward consumers for use of payment accounts and/or for performing transactions at particular merchants, e.g., the services may include reward services and/or loyalty services, etc. Further added services may permit acquirers, the payment networks, and/or issuers involved in the purchase transactions to capture certain data, utilize existing message formats and/or standards (e.g., utilize transformation services, etc.), and/or improve ancillary functions related to marketing, customer services, consumer controls, security, onboarding, etc. Uniquely, the systems and methods herein allow for such added services to be distributed to, and performed by, edge devices of the payment networks, in whole, or in part. In this manner, by implementing the added services at the edge devices, use of internal, centralized devices of the payment networks (often used in connection with approving and/or otherwise processing the purchase transactions) in providing such services may be reduced. In turn, the systems and methods herein may provide more localized services to customers associated with the payment networks (e.g., acquirers, issuers, etc.), may improve scalability of the payment networks, may improve efficiencies in performance of the services, and may reduce interruptions, latency, and/or delay in processing the purchase transactions (to which the added services are attached) at the centralized devices. Further, in the systems and methods herein, the edge devices may be implemented, at least in part, in hardware (e.g., field programmable logic, gate arrays, etc.), rather than in software, to provide further efficiencies and/or reliability in performance of the services and/or potential field programmable updates and/or changes (e.g., via release management, etc.) to the services provided thereby.

Figure 1:
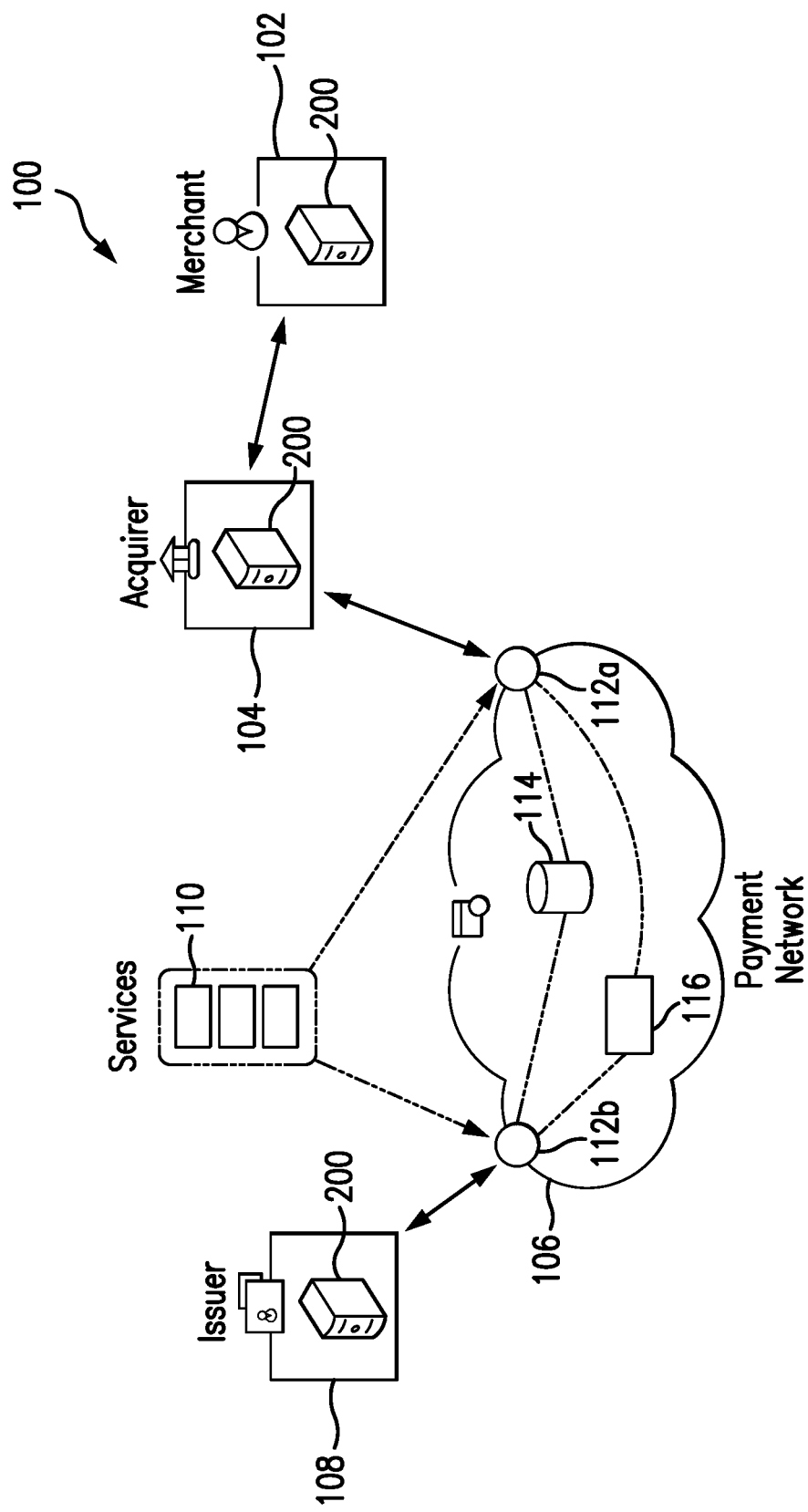
FIG. 1 is a block diagram of an exemplary system of the present disclosure suitable for use in distributing payment network services within a payment network.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, services associated with payment accounts and payment account transactions, etc.

As shown in FIG. 1, the system 100 generally includes a merchant 102, an acquirer 104, a payment network 106, and an issuer 108, coupled together (and in communication) via a network (as indicated by the arrowed lines). The network may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. In addition, in some embodiments the network may include multiple different networks, such as a private payment transaction network made accessible by the payment network 106 to the acquirer 104 and the issuer 108 and, separately, the public Internet, which may provide interconnection between the merchant 102, the payment network 106, the acquirer 104, and consumers, etc.

In the illustrated system 100, the merchant 102 is generally associated with products (e.g., goods and/or services, etc.), which are offered for sale and are sold to consumers in the system 100. The merchant 102 may offer the products for sale in physical locations (e.g., at brick-and-mortar locations, etc.) and/or in virtual locations (e.g., at internet-based store front locations, etc.), as desired.

Also in the system 100, consumers are able to fund transactions with the merchant 102 for one or more of the products, via payment accounts. The payment accounts may be issued by the issuer 108, for example, whereby the issuer 108 is involved to permit transactions to be funded by the payment accounts. In addition, one or more of the payment accounts may be issued by other issuers, not shown in the system 100. In connection therewith, the issuer 108 and/or other issuers, when providing payment accounts to consumers for use in transactions processed in association with the payment network 106, as is the case here, the issuers define and/or request particular services associated the payment accounts, individually or as a whole, for implementation by the payment network 106, etc. The services are described in more detail below. The consumers are further in possession of payment devices, also issued by the issuer 108, which are associated with the payment accounts. The payment devices may include, for example, credit cards, device cards, fobs, internet-based applications included in communication devices (e.g., at tablets, at smartphones, etc.) or any other suitable devices, etc.

In an exemplary purchase transaction, a consumer may initiate a transaction with the merchant 102 by presenting a payment device (issued by the issuer 108) to the merchant 102. In turn, the merchant 102 reads the payment device and causes an authorization request (broadly, a message) to be provided to the acquirer 104. The acquirer 104 then transmits the authorization request to the issuer 108, via the payment network 106, such as, for example, through MasterCard®, VISA®, Discover®, American Express®, etc. In response, the issuer 108 determines if the transaction is approved or declined based on a variety of factors, including, for example, the status of the payment account, the balance of the payment account, etc. When approved, the issuer 108 provides an authorization reply (broadly, a message), indicating the approval, back through the payment network 106, to the acquirer 104 and the merchant 102. The merchant 102 is then able to continue the transaction with the consumer. Alternatively, when the transaction is declined, the issuer 108 provides an authorization reply, declining the transaction, back through the payment network 106 to the acquirer 104 and the merchant 102. The merchant 102 may then terminate the transaction or seek other forms of funding for the transaction.

Further, as the authorization messages are transmitted via the payment network 106, one or more services may be enabled relative to the underlying transactions and/or the messages associated therewith. For example, based on the particular payment account involved, based on a location and/or type of the merchant 102, and/or based on the issuer 108 associated with the payment account, the payment network 106 may provide transaction and/or transformation services, fraud services, intelligent routing services, etc. (e.g., at its own initiative, based on specifications provided by the issuer 108, based on preferences provided by the consumers, etc.).

Transaction data is generated, collected, and stored as part of the above exemplary interactions among the merchant 102, the acquirer 104, the payment network 106, the issuer 108, and the consumer (and is included in the various transaction messages). The transaction data represents at least a plurality of transactions (e.g., purchase transactions, withdrawal transactions, deposit transactions, attempted transactions, etc.), and may include, for example, authentication data, authorization data, clearing and/or settlement data, service-oriented data, etc. The transaction data, in this exemplary embodiment, is stored at least by the payment network 106 (e.g., in a data structure associated with the payment network 106, etc.). Additionally, or alternatively, the merchant 102, the acquirer 104 and/or the issuer 108 may store the transaction data, or part thereof, in a data structure, or transaction data may be transmitted between parts of the system 100 as used or needed. The transaction data may include, for example, a payment account number (PAN) for the consumer involved in the transaction, an amount of the transaction, a merchant ID for the merchant 102 involved in the transaction, a merchant category code (MCC) for the merchant 102, a date/time of the transaction, products purchased in the transaction and related descriptions or identifiers, etc. It should be appreciated that more or less information related to transactions, as part of either authorization or clearing and/or settlement, may be included in transaction records and stored within the system 100, at the merchant 102, the acquirer 104, the payment network 106 and/or the issuer 108.

In various exemplary embodiments, consumers involved in the different transactions herein agree to legal terms associated with their payment accounts, for example, during enrollment in their accounts, etc. In so doing, the consumer may voluntarily agree, for example, to allow merchants, issuers, payment networks, acquirers, etc., to use data collected during enrollment and/or collected in connection with processing the transactions, subsequently, for one or more of the different operations described herein.

With continued reference to FIG. 1, in the system 100, the payment account for the consumer involved in the above exemplary transaction is associated with services (generally indicated at reference number 110) offered by the payment network 106 and applied, for example, based on the issuer 108, the type of the payment account, etc. The services may be referred to as value added services, for example, in that the services are often provided to the consumer in addition to the standard payment network object of coordinating authorization of transactions performed by the consumer. Exemplary services may include, without limitation, fraud services (e.g., fraud scoring, etc.), loyalty services (e.g., managing reward points, etc.), account control services (e.g., transaction limits, etc.), authentication services, routing intelligence services, message transformation services (e.g., format and/or standard conversions, etc.), services for applying additional derived data and/or insights to transaction messages, identification of other value added services to be applied, etc.

Further in the system 100, the payment network 106 includes edge devices 112a-b, a data structure 114 and an internal device 116. The edge devices 112a-b include devices through which the acquirer 104 and/or the issuer 108 (e.g., also referred to as banking institutions, customers of the payment network 106, etc.) communicate with each other and/or with the payment network 106. As an example, the edge devices 112*a-b* may include interface processors, which may be, for example, MasterCard® interface processors (MIPs), etc.

In general, and without limitation, the edge devices 112*a-b*, and other edge devices as may be included in the system 100, are often geographically distributed across the payment network 106. As such, as the payment network 106 extends across borders and into different regions, edge devices will be disposed in the additional regions, often communicating with internal device 116 and/or other internal devices of the payment network 106 in a central region and/or a limited number of regions. Stated another way, the edge devices 112*a-b* will often be more widely distributed into multiple regions, while the internal device 116 (and other internal devices) are not. In this manner, the edge devices 112*a-b* may be limited to specific regions, whereby the edge devices 112*a-b* are configured to be accessible to banking institutions and/or other entities only within the particular regions (e.g., to accept authorization messages therefrom, etc.), while still communicating internally with the internal device 116 outside the particular regions.

Further, in this exemplary embodiment, the edge devices 112*a-b* are coupled to the data structure 114, which, again, may be limited to a particular region and include certain information related to that region, or not. In one example, the data structure 114 includes lists of PANs marked for fraud, routing tables for messages, transformation mappings, encryption keys and/or decryption keys, compression/decompression algorithms, business rules and message flags for localized regulations, etc. That said, the data structure 114 may be included, as indicated by the dotted lines, in one or both of the edge devices 112*a-b* (in whole, or in part), and/or further may be implemented (in whole or in part) in a particular and/or centralized location (e.g., within a specific region, etc.) for a common sharing of data from each of the multiple edge devices 112*a-b*. And, the internal device 116 of the system 100 (in contrast to the edge devices 112*a-b*) is generally inaccessible to the acquirer 104 and the issuer 108, and often coordinates internal communication and/or processing within the payment network 106 and among the different edge devices 112*a-b*, etc. For example, the internal device 116 may facilitate communication of the authorization request in the above exemplary transaction. In addition, the internal device 116 can be configured to provide additional security (e.g., maintain secret information such as cryptography keys that should not otherwise be known to others, etc.), etc.

It should be understood that while only two edge devices 112*a-b*, only one data structure 114, and only one internal device 116 are illustrated in FIG. 1, the system 100 may include any desired number of such devices and/or data structures within the scope of the present disclosure.

Figure 2:
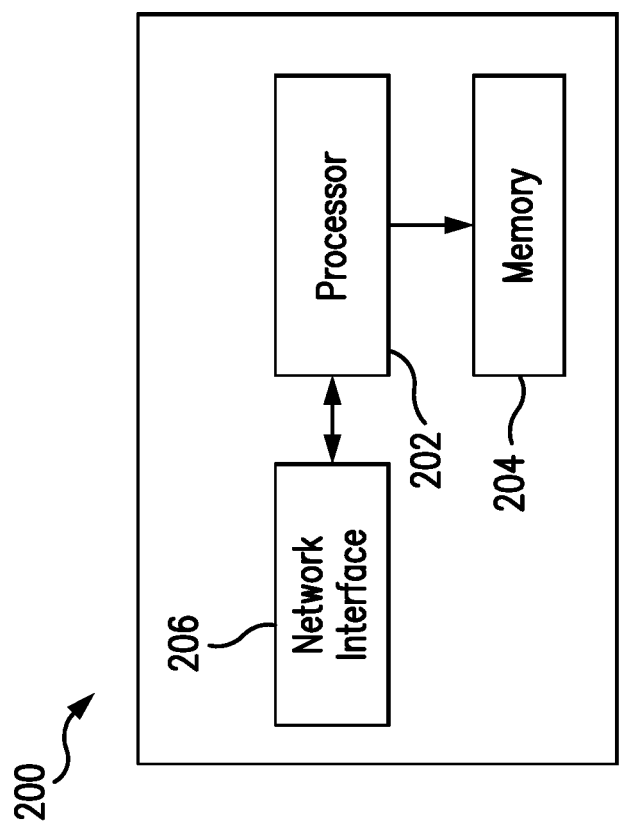
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, computers, laptops, POS devices, ATMs, etc. In addition, the computing device 200 may include a single computing device, or it may include multiple computing devices located in close proximity or distributed over a geographic region, so long as the computing devices are configured to function as described herein.

In the system 100, each of the merchant 102, the acquirer 104, and the issuer 108 are illustrated as including, or being implemented in, computing device 200 (each coupled to, and in communication with, the network interconnecting these parts of the system 100). In addition, and while not shown, the payment network 106 may include, or may be implemented in, a computing device consistent with computing device 200. Further, each of the edge devices 112*a-b* and the internal device 116 associated with the payment network 106 may be considered a computing device consistent with computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a programmable gate array (e.g., a field programmable gate array (FPGA), etc.), a system on chip (SOC), and/or any other circuit or processor capable of the operations described herein. In the system 100, for example, each of the edge devices 112*a-b* may include a hardware processor, such as, for example, an FPGA, PLD, ASIC, etc., whereby operations performed thereby are implemented directly in hardware in the device, rather than in software in a general purpose processor, as described more below.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, account information, service data structures (e.g., loyalty points, fraud scores, account control rules, etc.) related to the services 110 (and/or others), and/or other types of data (and/or data structures) suitable for use as described herein. Furthermore, in various embodiments, computer-executable instructions, i.e., software instructions, may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 that is performing one or more of the various operations herein. In addition, one or more load files may be stored in memory 204, which include hardware descriptions that, when loaded to the processor 202 (or another processor), cause the processor 202 to be structured consistent with the descriptions herein (e.g., descriptions of gate array arrangements/configurations, etc.).

Further, the illustrated computing device 200 also includes a network interface 206 coupled to (and in communication with) the processor 202 (and/or the memory 204). The network interface 206 may include, without limitation, a wired network adapter, a wireless network adapter, a mobile network adapter, or other device capable of communicating to one or more different networks, for example, as included in the system 100. Further, in some exemplary embodiments, the computing device 200 includes the processor 202 and one or more network interfaces 206 incorporated into or with the processor 202.

Referring again to FIG. 1, each of the edge devices 112*a-b* of the system 100 is configured to perform one or more of the services 110, in whole or in part, as described herein. Generally, the payment network 106 is organized whereby the services 110 offered by the payment network 106 are distributed, at least in part, to the edge devices 112*a-b* of the payment network 106. As such, the edge devices 112*a-b*, alone or in combination with the data structure 114, are configured to provide the services 110 in connection with various messages received by the edge devices 112*a-b*, such as, for example, messages related to purchase transactions received by the edge devices 112*a-b*, etc. What's more, the edge devices 112*a-b* (and potentially other edge devices in the system 100) are configured to control the flow of message traffic (and/or other traffic) (e.g., apply load balancing, transform messages, route messages, etc.), open messages for interrogation, log transactions for future incident management needs, as well as to control checks for instructions for PAN-based services (e.g., appending additional data to messages, etc.), etc. In this manner, the payment network 106 may avoid routing certain messages (or forms of messages), in connection with providing the services 110, from the edge devices 112*a-b* (when originally received at the edge devices 112*a-b*) to the internal device 116 (or to other different edge devices outside the particular region(s) of the edge devices 112*a-b*). As such, in various embodiments, because the edge devices 112*a-b* are often region specific, the payment network 106 is able to abide by regional restrictions on the transfer of payment account data, while continuing to offer the services 110 in a distributed matter (i.e., the various services can be implemented by the given edge devices 112*a-b* upon receipt of the messages at the edge devices 112*a-b*, in the particular regions in which the edge devices 112*a-b* are located, without transferring the messages out of the region to the internal device 116).

In particular, for example, each of the edge devices 112*a-b* is configured to receive, from the acquirer 104, an authorization request (broadly, a message) related to a payment account for a consumer in connection with a transaction at the merchant 102. The edge devices 112*a-b* are also configured to identify ones of the services 110 associated with the authorization request received at the edge devices 112*a-b*, and/or the payment account involved, and to then perform the identified ones of the services 110. Further, the edge devices 112*a-b* are configured to, in parallel with providing the identified ones of the services 110, or prior to or after, transmit the authorization request to the issuer 108 associated with the payment account, and then to transmit an authorization reply, generated by the issuer 108, back to the acquirer 104. In one embodiment, the edge devices 112*a-b*, for example, may be configured to provide message transformation services, whereby a message is transformed from one standard and/or format to another (e.g., transform a message from ISO 8583 to ISO 20022, etc.). As such, the particular ones of the services 110 that are performed by the edge devices 112*a-b* are effectively distributed to the edge devices 112*a-b* for such performance, where the authorization request, authorization reply, etc. are received, thereby avoiding the internal device 116, and generally independent of communication of the authorization request to the issuer 108 and/or the authorization reply to the acquirer 104.

It should be appreciated that, while in the above example the authorization request and authorization reply for the purchase transaction are described as received by one of the edge devices 112*a-b* (from the acquirer 104, the issuer 108, etc.), the edge devices 112*a-b* may also be configured to receive other messages from other customers of the payment network 106 (independent of purchase transactions, etc.). For example, the messages may include, or may be associated with, authorization messages (e.g., authorization requests, authorization replies, etc. as described above), real time clearing messages, advice messages, sign-on messages, repeat delivery messages, response messages, administrative messages, etc. It should also be appreciated that the edge devices 112*a-b* may be configured to perform some of the services 110, but not others, or to perform certain parts of the services 110, but not others (with the other parts performed by other edge devices 112*a-b*, by the internal device 116, etc.).

In various embodiments (and as previously described), the edge devices 112*a-b* of the payment network 106 are configured by hardware instructions, rather than software instructions. More specifically, for each of the edge devices 112*a-b*, the processor 202 contained therein is generally a hardware implementation of the services 110 (or particular ones of the services 110, or part of the services 110) offered by the payment network 106, whereby the processor 202 is physically structured, set and/or altered to perform the operations herein, and is therefore not a general use processor. In one example, a load file may be distributed to the edge device 112*a*, which defines the operations thereof. When the edge device 112*a* is powered, or re-powered, the load file is written and/or loaded to the processor 202 of the edge device 112*a*, whereby the instructions of the load file are physically implemented therein, such that the processor 202 is configured as described herein. In this example, the processor 202 of the edge device 112*a* may include a FPGA, where the processor 202 is re-written by distribution of the new load file and/or a power cycle, etc., thereby providing field programmability (and/or release management) to the processor 202 (and in the edge device 112*a*).

In another example, the edge device 112*b* may be manufactured so that the instructions to perform the operations described herein are burned and/or written to the processor 202 therein, based on a load file. In this example, the processor 202 of the edge device 112*b* may include an ASIC, where the processor 202 cannot be re-written in the field, via the load file, without direct interaction of the edge device 112*b* with an operator or technician, etc.

In general, each of the edge devices 112*a-b* includes a load file (or multiple load files) (broadly, hardware instructions) written, for example, by a hardware designer in a hardware descriptive language, such as, without limitation, Very High Speed Integrated Circuit (VHSIC) Hardware Description Language (VHDL), etc. After the description of the logic of the various services 110 is written, it is compiled, using a conventional compiler, to provide the load file, which is then used to define an ASIC, to program the PLD, or to distribute with the FPGA (for field loading at power up of the device, or reboot of the device, for example), etc. Further, the load file may be directed to one of the services 110 or to multiple ones of the services 110 (in whole or in part), as well as to ancillary operations associated with the edge devices 112*a-b*, for example.

Further, in the system 100, the load files define business logic to be used by the edge devices 112*a-b* to handle messages received at and/or transmitted from the edge devices 112*a-b*. The business rules, which may then be changed by deploying new load files to the edge devices 112*a-b*, in turn, rely on data, which may be streamed from a remote memory, or included in local memory. In connection therewith, data may be stored in memory (e.g., in memory 204, etc.) to assist in message processing. For example, timers may be implemented in the edge devices 112a-b, such that messages (e.g., authorization messages, etc.) are processed in a timely manner as defined by one or more quality of service metrics, etc. In addition, data such as cryptography keys and/or PAN level data for instruction on processing may further be stored in external devices, and retrieved by the edge devices 112a-b (as defined by the business logic of the load file).

While the data structure 114 associated with the payment network 106 is illustrated in the system 100 as separate from the edge devices 112a-b, it should be appreciated that it may be incorporated in whole or in part with the edge devices 112a-b (as indicated by the dotted lines in FIG. 1). In at least one example, each of the edge devices 112a-b includes a data structure 114 containing service data for the region relating to the services 110, in which the respective edge devices 112a-b is/are located. As such, the data structure 114 may be easily and/or efficiently accessed, and may also be generally region-specific. The data structure 114 may further be updated and/or revised, by the internal device 116 of the payment network 106 or a central data structure, at one or more regular or irregular intervals, or as needed.

Figure 3:
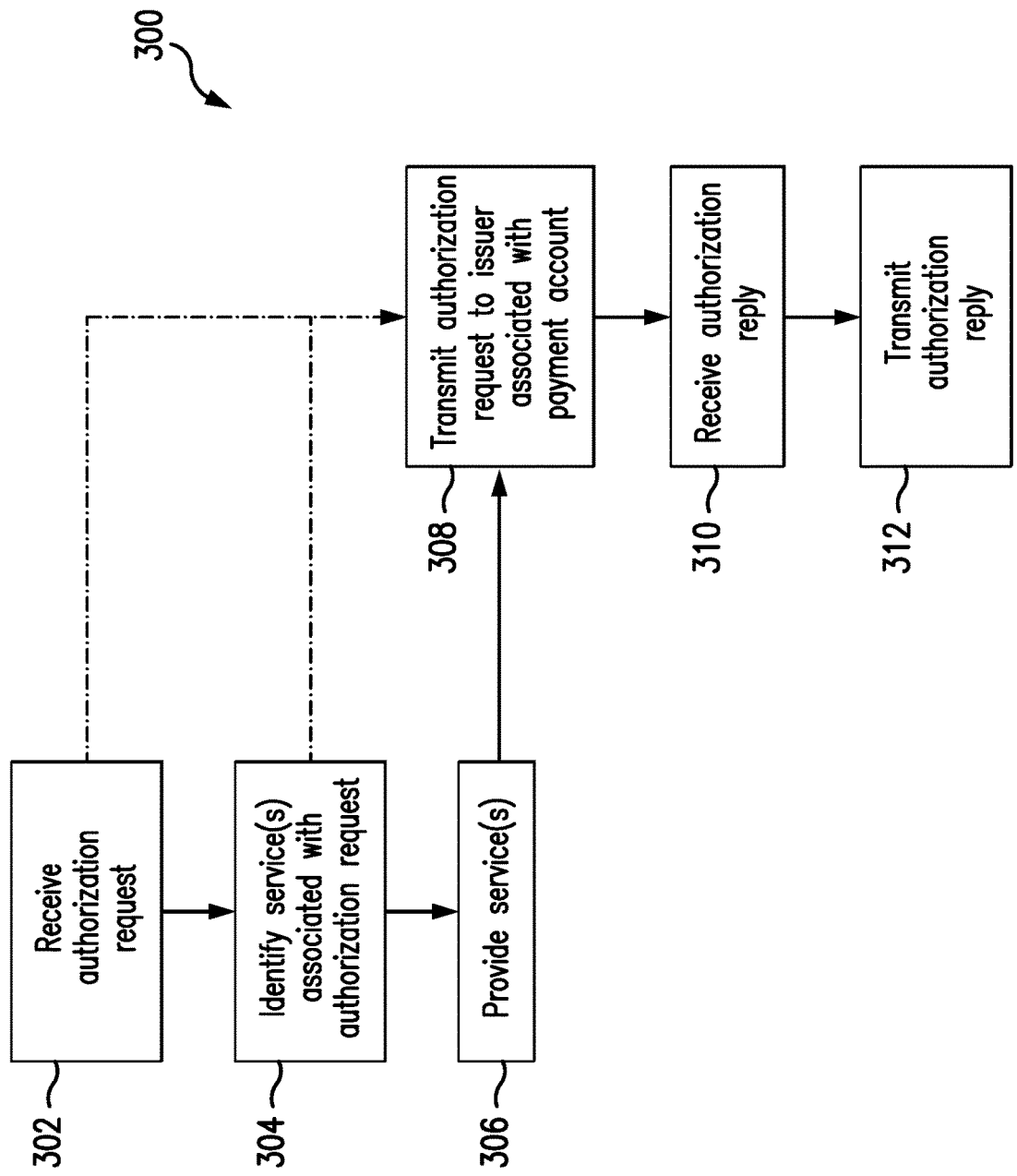
FIG. 3 is an exemplary method, which may be implemented in connection with the system of FIG. 1, for distributing services associated with the payment network to edge devices of the payment network.

FIG. 3 illustrates an exemplary method 300 for use in distributing services, associated with a payment network, to edge devices of the payment network. The method 300 is described with reference to the edge device 112a, and also to the merchant 102, the acquirer 104, the payment network 106, and the issuer 108 of the system 100, and further with reference to the computing device 200. While described in connection with the edge device 112a, it should be appreciated that the method is also applicable to edge device 112b. In addition, it should also be appreciated that the methods herein are not limited to the system 100 and computing device 200, and that the systems and computing device herein are similarly not limited to the method 300.

As shown in FIG. 3, in the illustrated method 300 the edge device 112a initially receives an authorization request, at 302, from the acquirer 104, for example, based on a purchase transaction by a consumer at the merchant 102 (e.g., based on the exemplary purchase transaction described above between the consumer and the merchant 102, etc.). The authorization request includes various transaction data regarding the transaction, such as a PAN for the consumer's payment account, an amount of the transaction, and a merchant ID for the merchant 102.

In response, the edge device 112a identifies, at 304, one or more of the services 110, associated with the payment network 106, to be performed for (or in connection with) the authorization request. The edge device 112a may identify the particular ones of the services 110 based on the PAN included in the authorization request, or part thereof (e.g., a BIN, etc.), based on a merchant ID for the merchant 102, or based on other transaction data (or other data) included in the authorization request. In addition, it should be appreciated that any of the services 110 provided by the payment network 106 may be implicated in the method 300 (and identified by the edge device 112a), as desired and/or as appropriate. For example, certain customers of the payment network 106 may request (or may require) particular ones of the services 110 to be performed for various transactions (e.g., for various transactions involving payment accounts issued to the customers, involving merchants serviced by the customers, etc.), while other customers may request (or may require) other ones of the services 110 to be performed.

As an example, the edge device 112a may identify the consumer's payment account based on the PAN included in the authorization request and determine that, for the consumer's payment account, the issuer 108 (that issued the payment account to the consumer) requests (or requires) a fraud score to be generated for the transaction (e.g., and for all transactions involving the consumer's payment account, etc.) and delivered with the authorization request to the issuer 108. As another example, the edge device 112a may identify the merchant 102 involved in the transaction based on a merchant ID included in the authorization request and determine that a fraud score is to be generated for the transaction (e.g., and for all transactions involving the merchant 102, etc.) and delivered with the authorization request to the issuer 108.

That said, some customers of the payment network 106 may not request (or require) any of the services 110 to be performed at all, regardless of the transaction. Or, in some embodiments, the payment network 106 may determine which, if any, of the services 110 are to be performed.

Next in the method 300, the edge device 112a performs the identified one or more of the services 110, at 306. Uniquely, the edge device 112a performs the desired service(s) (or at least partially performs the desired service(s)) in lieu of, for example, transmitting the authorization request to another part of the system 100 for it/them to be done (e.g., instead of transmitting the authorization request to the internal device 116 to perform the desired service(s), etc.). Thus, in connection with the above examples, the edge device 112a is structured (e.g., includes appropriate instructions, etc.) to perform fraud scoring services for the authorization request (e.g., is structured to generate the requested fraud scores, etc.).

In particular in this example, the edge device 112a is structured to accept the authorization request (broadly, a message) and interrogate the services necessary (e.g., value added services, etc.). Value added services, when identified for example, would then be performed on the transaction associated with the authorization request by the edge device 112a, such as CVC validation, PIN validation, cryptogram validation, etc. (rather than at another internal device (e.g., internal device 116, etc.)). Once the value added services are conducted by the edge device 112a (and the underlying transaction is confirmed and/or validated), the underlying transaction is then further routed to the issuer 108 for evaluation. It should be appreciated that various other examples of services, as indicated above, being performed at the edge device 112a (and/or edge device 112b), are contemplated and within the scope of the present disclosure.

With continued reference to FIG. 3, after performing the identified one or more of the services 110, the edge device 112a then transmits the authorization request for the purchase transaction to the issuer 108, at 308, whereby the issuer 108 determines whether to approve or decline the transaction (as described above for the system 100).

In some implementations of the method 300, the one or more of the services 110 identified and performed by the edge device 112a, at 304 and 306, is not required in order for the issuer 108 to approve or decline the purchase transaction. In such implementations of the method 300, and as indicated by the dotted lines in FIG. 3, the edge device 112a may transmit the authorization request for the purchase transaction to the issuer 108, at 308, at any time after receiving the authorization request. The various service(s) are then performed by the edge device 112a (after transmitting the authorization request to the issuer 108), and the corresponding results are transmitted accordingly.

As an example, when the identified service involves a loyalty service, in which points may be awarded to the consumer's payment account for the purchase transaction (or to an award account for the consumer associated with the payment account), performance of the service (i.e., interrogating for the use of loyalty points to pay for a product) is generally unrelated to whether or not the transaction should be approved. As another example, when the identified service involves a security service such as authenticating a form factor (e.g., CVC validation, etc.) or authenticating a consumer (e.g., PIN validation, etc.), performance of the service may potentially be unrelated to whether or not the underlying transaction itself should be approved. In connection therewith, the edge device 112a may determine an amount of points to be awarded to the consumer's payment account and, in connection therewith, transmit a communication to the issuer 108 (independent from the authorization request) identifying the consumer's payment account and the amount of points to be awarded.

In any case, and regardless of when the edge device 112a transmits the authorization request to the issuer 108, the edge device 112a in turn receives, at 310 (either directly or via the internal device 116), an authorization reply from the issuer 108. As previously described, the authorization reply includes an indication either approving or declining the purchase transaction at the merchant 102. At 312, the edge device 112a transmits the authorization reply to the acquirer 104, which in turn provides the authorization reply back to the merchant 102 (as generally described above).

While the method 300 is described, mainly, with reference to an authorization request related to a purchase transaction, various other services associated with messaging within the payment network 106 may be provided. For example, the edge device 112a may be scattered geographically and with the computing capability at the edge, whereby a message received from the merchant 102 and/or an automated teller machine ATM at the acquirer 104 (e.g., to pay a utility bill in South Africa) is provided in the ISO 8586 standard (broadly, a specific format). If the message, however, is handled in another region (e.g., a bank associated with the utility in the U.S.), or by another device within the payment network 106 in the ISO 20222 standard, the edge device 112a is configured to transform the incoming message from the ISO 8586 standard to a message in the ISO 20222 standard, whereby the edge device 112a provides "connectivity as a service" to transform messages between at least the exemplary formats.

In this manner, the edge devices 112a-b are able to transform messages received from any different banking institutions and payment networks, who subscribe to the services 110, without having to change the messages provided by the different banking institutions and/or payment networks. In addition, when one or more issuers want to customize the standard transformations unique for themselves, each can provide the specific standard and/or format to the payment network 106, for example, which in turn may modify the transformation of the edge device 112a, for example, to accommodate the same. As explained above, this may be accomplished by a combination of updated data in the data structure 114 and/or an updated load file deployed to the edge device 112a. It should be appreciated that changes in routing of messages, optimization of message routing and/or centralization of information sharing may be implemented in similar manners.

Further, in connection with such message formats and/or standards (and transformation of such messages from one format and/or standard to another), when the format of an input message, for example, received by the payment network 106 (e.g., as received at edge device 112a, etc.) is incorrect, the receiving edge device 112a, for example, may transmit the message to the internal device 116, which in turn may include particular handling instructions for such message or may deny any further services with appropriate error messaging as the response. And, when an output message format from the payment network 106 (e.g., from one of the edge devices 112a-b, etc.) is incorrect, as identified by a recipient of the message (e.g., a customer of the payment network 106 (e.g., the acquirer 104, the issuer 108, etc.), another edge device in the transaction flow, another internal device, etc.), the recipient of the message may trigger a retry of the transformation of the message format (in this example), or the recipient may report back the failure to the source of the underlying transaction associated with the message, or the recipient may mark the message for offline analysis and trigger appropriate action (e.g., appropriate stand-in actions as generally known, user involved review, etc.), etc.

It should also be appreciated that in the payment network 106 (and in other payment networks), destination addresses for messages received by the payment network 106 and/or transmitted by the payment network 106 are typically used in routing the messages to different endpoints of the system 100. When the format, standard, etc. of a given message is mismatched at a receiving end (e.g., as either introduced by the issuer 108 or the acquirer 104, etc.), the message may be routed through a centralized transformation before being routed to the destination. That said, in the illustrated system 100, the edge device 112a, for example, receiving the message may transform the message to the format, standard, etc. accepted by the destination based on an existing lookup data structure (or routing table) in the data structure 114, for example (whether included in the edge device 112a, or not), such that there may no longer be a need to route the message, intermediately, to the centralized services (i.e., the edge device 112a, in this example, simply transforms the message based on the lookup data structure 114 and transmits the message to the desired destination). Also, the lookup data structure may be stored in the edge devices 112a-b, in whole or in part, and may include additional hopping points within the payment network 106, which are intermediate to the final destination for every message format, standard, etc. Such intermediary hopping points may be identified as optimized routing within the payment network 106. Further, the lookup data structure in the data structure 114 may be uploaded and/or updated, in the edge devices 112a-b, from a centralized location upon certain events (e.g., changes in implementations, planned/unplanned outages, etc., and/or based on regulation needs, or other desired events or undesired events, etc.).

In view of the above, the systems and methods herein may enable distribution of services within payment networks, so that the services can be performed near the customer in a more efficient and timely manner, thereby avoiding latency and/or delays associated with centralized, or non-localized, service providers. Further, the distributed services provide for improved reliability and scalability of the payment network. Moreover, when implemented in hardware, the services may provide improved reliability and/or further efficiencies to the payment networks, whereby transaction authorizations and/or services related to messages (including authorization messages) associated with the payment network may be improved.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code and/or load files (prior to implementation in hardware) in the form of instructions or data structures and that can be accessed by a processor, and/or implemented in hardware. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing one or more of: (a) receiving, at an edge device of a payment network, from a banking institution, a payment network message; (b) identifying the message as being associated with a service, based on a primary account number (PAN) included in the message; (c) performing, at the edge device of the payment network, the identified service; and (d) transmitting a reply message, for the received message, to the banking institution, whereby the service is performed at the edge device of the payment network and without transmitting the message to a centralized internal device of the payment network.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A payment network for use in distributing services in association with requests involving payment accounts, the payment network comprising:
   multiple edge devices for communicating with at least one customer; and
   at least one internal network device disposed in a first region and coupled to at least one of the multiple edge devices, the at least one internal network device configured to interact with the at least one of the multiple edge devices;
   wherein the at least one of the multiple edge devices is disposed in a second region, different than the first region, and configured, by a load file, to:
      receive a request from a customer related to a payment account, the request directed to the at least one internal network device in the first region, the request including data associated with a region restriction for the second region;
      identify at least one service associated with the request and/or the payment account;
      in response to identifying the at least one service:
         at least partially perform said at least one service, in lieu of transmitting the request to the at least one internal network device in the first region, whereby said at least one service is distributed to the edge device in the second region consistent with the region restriction;
         append a result of the at least one service to the request; and
         transmit the request, with the result of the at least one service, to an issuer associated with the payment account.

2. The payment network of claim 1, wherein the at least one of the multiple edge devices includes at least one of a logic device and a programmable gate array (PGA) configured, by the load file, to at least partially perform the at least one service.

3. The payment network of claim 1, wherein the at least one of the multiple edge devices is configured, in hardware and based on the load file, to at least partially perform said at least one service.

4. The payment network of claim 1, wherein the at least one of the multiple edge devices is further configured to access a data structure disposed in the second region; and
wherein the at least one of the multiple edge devices is configured to at least partially perform said at least one service, based, at least in part, on said access to the data structure.

5. The payment network of claim 4, wherein the at least one of the multiple edge devices includes one of a gate array and an application specific integrated circuit (ASIC) configured to at least partially perform said at least one service, based, at least in part, on said access to the data structure.

6. The payment network of claim 1, wherein the request includes an authorization request consistent with an ISO standard for a payment transaction to said payment account;
wherein said at least one service includes a fraud protection service associated with the authorization request; and
wherein the result includes a fraud score.

7. The payment network of claim 1, wherein the at least one service includes a loyalty service; and
wherein the at least one of the multiple edge devices is further configured to determine a reward associated with a transaction indicated by the request and to transmit a communication to the issuer identifying the payment account and the determined reward.

8. The payment network of claim 1, wherein the at least one of the of the multiple edge devices is further configured to receive a reply to the request, from the issuer, and to transmit the reply to the customer.

9. The payment network of claim 1, wherein the at least one of the multiple edge devices is further configured to transform the request from a first format to a second format, prior to transmitting the request to the issuer.

10. A computer-implemented method for use in distributing services associated with purchase transactions in a payment network, the method comprising:
receiving, at an edge device of a payment network, from a banking institution, a payment network message, the edge device disposed in a first region associated with a regional restriction on transfer of payment account data included in the payment network message, wherein the edge device is coupled in communication with an internal processing device of the payment network, the internal processing device disposed in a second region different than the first region;
identifying a service associated with the payment network message, based on a primary account number (PAN) included in the payment network message;
in response to identifying the service:
performing, at the edge device of the payment network, in said first region, the identified service, in lieu of transmitting the payment network message to the internal processing device in the second region and in conformance with the regional restriction; and then
transmitting a reply message, for the received payment network message, to the banking institution, the reply message indicative of the performed identified service.

11. The computer-implemented method of claim 10, wherein the payment network message includes an authorization request for a purchase transaction.

12. The computer-implemented method of claim 10, further comprising:
receiving, at the edge device of the payment network, from a different device of the payment network, a second payment network message; and
causing the second payment network message to be provided to a different banking institution, without identifying and performing a service, at the edge device of the payment network, for the second payment network message.

13. The computer-implemented method of claim 10, wherein identifying the service associated with the payment network message is further based on a bank identification number (BIN) included in the PAN.

14. The computer-implement method of claim 13, wherein performing the identified service includes generating a fraud score for a transaction indicated by the payment network message; and
further comprising appending the fraud score to the reply message prior to transmitting the reply message to the banking institution.

15. The computer-implemented method of claim 10, further comprising accessing at least one data structure associated with the identified service and disposed in the first region; and
wherein performing the identified service includes performing said service based on the access to the data structure disposed in the first region.

16. The computer-implemented method of claim 10, further comprising transforming the received payment network message from a first standard and/or format to a second standard and/or format.

17. An edge device processor for distributing services consistent with regional restrictions, the edge device processor disposed in a first region and structured, based on at least one load file, to:
receive an authorization request, from an acquirer included in the first region, for a transaction to a payment account;
identify at least one service for the transaction, based on a primary account number (PAN) included in the authorization request, to be performed in connection with the transaction;
in response to identifying the at least one service:
perform the identified at least one service, in the first region, in lieu of transmitting the PAN from the authorization request to an interval device of a payment network in a second region different than said first region, thereby abiding by a regional restriction associated with said first region and/or the edge device processor;
appending a result of the at least one service to the authorization request; and
transmit the authorization request with the result to an issuer payment account identified by the PAN.

18. The edge device processor of claim 17, wherein the edge device processor is further structured, based on the at least one load file, to transmit an authorization reply for the transaction, received from the issuer in response to the authorization request, to the acquirer, the authorization reply including the PAN; and wherein the edge device processor comprises a logic device or field programmable gate array (FPGA) configured, by the at least one load file, to perform the at least one service.

19. The edge device processor of claim 17, wherein the edge device processor is further structured, based on the at least one load file, to:

access a data structure disposed in said first region; and update the edge device processor based on updated data included in the data structure and/or at least one updated load file deployed to the edge device processor.

* * * * *